(12) United States Patent
Mori

(10) Patent No.: US 7,928,027 B2
(45) Date of Patent: Apr. 19, 2011

(54) OPTICAL GLASS AND OPTICAL ELEMENT

(75) Inventor: Toshiharu Mori, Settsu (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 454 days.

(21) Appl. No.: 11/473,623

(22) Filed: Jun. 23, 2006

(65) Prior Publication Data

US 2007/0004581 A1 Jan. 4, 2007

(30) Foreign Application Priority Data

Jun. 30, 2005 (JP) .................................. 2005-191519

(51) Int. Cl.
C03C 3/066 (2006.01)
(52) U.S. Cl. .......................................... 501/79; 501/78
(58) Field of Classification Search .................... 501/78, 501/79, 50, 51
See application file for complete search history.

(56) References Cited

U.S. PATENT DOCUMENTS

| 3,958,999 | A | * | 5/1976 | Izumitani et al. ................ | 501/51 |
| 6,251,813 | B1 | * | 6/2001 | Sato ................................ | 501/78 |
| 6,816,235 | B2 | * | 11/2004 | Kido et al. ...................... | 355/67 |

FOREIGN PATENT DOCUMENTS

| EP | 0 552 932 A1 | | 7/1993 |
| JP | 60221338 A | * | 11/1985 |
| JP | 62100449 A | * | 5/1987 |
| JP | 03093645 A | * | 4/1991 |
| JP | 6-107425 A | | 4/1994 |
| JP | 2001130924 A | * | 5/2001 |
| JP | 2002029773 A | * | 1/2002 |
| JP | 2003-176151 A | | 6/2003 |
| JP | 2003252647 A | * | 9/2003 |
| JP | 2005047732 A | * | 2/2005 |
| JP | 2006111482 A | * | 4/2006 |
| JP | 2006137628 A | * | 6/2006 |
| JP | 2006137645 A | * | 6/2006 |

OTHER PUBLICATIONS

Machine translation of JP 2006-137645, Jun. 2006.*
Machine translation of JP 2006-137628, Jun. 2006.*
Machine translation of JP 2006-111482, Apr. 2006.*
Machine translation of JP 2001-130924, May 2001.*
Machine translation of JP 2002-29773, Jan. 2002.*
Machine Translation of JP 2005-047732 A, Feb. 24, 2005.*

* cited by examiner

*Primary Examiner* — Karl E Group
*Assistant Examiner* — Elizabeth A Bolden
(74) *Attorney, Agent, or Firm* — Sidley Austin LLP

(57) ABSTRACT

The optical glass of the invention comprising: $SiO_2$: 10 to 30%, $B_2O_3$: 15 to 35%, $Li_2O$: 0 (inclusive) to 10%, $Na_2O$: 0 (inclusive) to 5%, and $K_2O$: 0 (inclusive) to 5% provided that $Li_2O+Na_2O+K_2O$: 0 to 15%; MgO: 0 (inclusive) to 25%, CaO: 0 (inclusive) to 25%, BaO: 0 (inclusive) to 25%, SrO: 0 (inclusive) to 25%, and ZnO: 18 to 55% provided that MgO+CaO+BaO+SrO+ZnO: 18 to 55%; and $La_2O_3$: 5 to 20%. This optical glass does not substantially contain poisonous materials such as lead and arsenic. This optical glass has given optical constants, has a low Tg, a low TL and a good devitrification resistance, and is suitable for press molding.

9 Claims, No Drawings

OPTICAL GLASS AND OPTICAL ELEMENT

The present application claims priority to Japanese Patent Application No. 2005-191519 filed Jun. 30, 2005, the entire content of which is hereby incorporated by reference.

BACKGROUND OF THE INVENTION

1. Field of the Invention

The present invention relates to an optical glass and an optical element comprising this optical glass, more specifically an optical glass suitable for press molding, and an optical element comprising this optical glass.

2. Description of the Related Art

In recent years, what is called press molding, wherein glass heated at not lower than the yield-temperature (At) thereof is pressed with a mold, which is made of a pair of upper and lower mold parts, thereby molding the glass, has widely been used as a process for producing an optical element such as a glass lens since the press molding has a smaller number of producing steps than any conventional process of polishing glass so that the press molding makes it possible to produce the element inexpensively in a short time.

This press molding can be roughly classified into a reheating process and a direct press process. The reheating process is a process of forming a gob pre-form or polished pre-form having a shape very similar to a shape of a final product, heating the pre-form at not lower than the softening temperature thereof again, and then press molding the pre-form with a heated mold, which is made of a pair of upper and lower mold parts, thereby making the pre-form into a final product shape. On the other hand, the direct press process is a process of dropping melted glass droplets from a glass melting furnace directly onto a heated mold, and then press molding the melted glass, thereby making the glass into a final product shape. In the press molding according to any one of these processes, it is necessary that when glass is formed, a press mold is heated at a temperature near the glass transition temperature, which may be designated as the "Tg" hereinafter, or a higher temperature. For this reason, when the Tg of the glass is higher, surface oxidization of the press mold or a change in the metal composition of the mold is more easily generated so that the lifespan of the mold becomes shorter. Thus, costs for the production increase. When the molding is performed in the atmosphere of an inert gas such as nitrogen, deterioration in the mold can be restrained. However, a machine for the molding becomes complicated in order to control the atmosphere, and further running costs of the inert gas is also required. Thus, the production costs increase. Accordingly, the glass used in press molding is desirably a glass the Tg of which is as low as possible. In order to improve the devitrification resistance of the glass, the liquid phase temperature thereof, which may be designated as the "TL" hereinafter, is desirably low in the same manner as the Tg.

In recent years, however, people have begun to fear that lead compounds which have been conventionally used to make the Tg low produce a bad effect onto the human bodies. Therefore, it has been intensely desired in the market not to use any lead compound. Thus, various techniques have been investigated and suggested for making the Tg and the TL of glass low without using any lead compound (see, for example, EP 552932A, Japanese Published Unexamined Patent Application No. 6-107425, and Japanese Published Unexamined Patent Application No. 2003-176151).

However, the optical glass in the EP 552932A has a larger linear thermal expansion coefficient; thus, the glass is easily cracked in the step of cooling the glass when the glass is formed. Furthermore, the viscosity is too low so that striae are easily generated in the glass. About the optical glasses of the Japanese Published Unexamined Patent Application Nos. 6-107425 and 2003-176151, the Tg thereof is not sufficiently low, and the TL is not low yet, so as to result in a problem in devitrification resistance.

SUMMARY OF THE INVENTION

A main object of the present invention is to provide an optical glass which does not substantially contain compounds such as lead and arsenic, is low in Tg and TL, has a good devitrification resistance, and is suitable for press molding.

Another object of the invention is to provide an optical element which has given optical constants, does not substantially contain compounds of lead, arsenic or other elements, and is high in productivity.

In order to attain the objects, the inventors have repeated eager investigations so as to find out that: when a relatively large amount of ZnO is incorporated into a $SiO_2$—$B_2O_3$ based glass composition, the Tg and the linear thermal expansion coefficient can be made low and small, respectively, while given optical constants are kept; and when a given amount of $La_2O_3$ is further incorporated into the composition, an improved endurance, a low TL and a viscosity suitable for press molding can be obtained. Thus, the present invention has been made.

Accordingly, in an aspect of the invention in order to attain the above-mentioned objects and other objects, an optical glass for press molding, comprises: $SiO_2$: 10 to 30%, $B_2O_3$: 15 to 35%, $Li_2O$: 0 (inclusive) to 10%, $Na_2O$: 0 (inclusive) to 5%, and $K_2O$: 0 (inclusive) to 5% provided that $Li_2O+Na_2O+K_2O$: 0 to 15%; MgO: 0 (inclusive) to 25%, CaO: 0 (inclusive) to 25%, BaO: 0 (inclusive) to 25%, SrO: 0 (inclusive) to 25%, and ZnO: 18 to 55% provided that MgO+CaO+BaO+SrO+ZnO: 18 to 55%; and $La_2O_3$: 5 to 20%. The symbol "%" means "% by weight" hereinafter unless otherwise specified.

The invention itself, together with further objects and attendant advantages, will best be understood by reference to the following detailed description.

DETAILED DESCRIPTION OF THE PREFERRED EMBODIMENTS

The reasons why the respective components of the optical glass of the invention are limited to the above-mentioned ratios will be described hereinafter.

First, $SiO_2$ is a component constituting the skeleton of the glass (glass former). If the content thereof is less than 10%, the endurance of the glass deteriorates. On the other hand, if the content of $SiO_2$ is more than 30%, the devitrification resistance deteriorates and further a glass having a high refractive index is not easily obtained. Thus, the content of $SiO_2$ is specified into the range from 10 to 30%. The content of $SiO_2$ is more preferably from 10 to 28%.

In the same manner as $SiO_2$, $B_2O_3$ is a component constituting the glass skeleton. If the content of $B_2O_3$ is less than 15%, the glass easily undergoes devitrification. On the other hand, if the content is more than 35%, the refractive index falls so that desired optical constants are not obtained. Thus, the content of $B_2O_3$ is specified into the range from 15 to 35%. The content is more preferably from 15 to 33%.

$Li_2O$ produces large effects of making the glass light and making the Tg low. If the content of $Li_2O$ is more than 10%, the endurance of the glass deteriorates and further the refractive index falls so that desired optical constants are not obtained. Thus, the content of $LiO_2$ is specified into the range from 0 (inclusive) to 10%.

$Na_2O$ and $K_2O$ are each useful as a component for making the Tg low. However, if each of the components is incorporated in an amount larger than 5%, the devitrification resistance deteriorates remarkably. Thus, the content of each of $Na_2O$ and $K_2O$ is specified into the range from 0 (inclusive) to 5%.

If the total amount of the $R_2O$ components wherein R is Li, N and K is more than 15%, the endurance deteriorates and further the refractive index falls not to give desired optical constants. Thus, the total amount of the $R_2O$ is specified into the range from 0 (inclusive) to 15%. The total amount of the $R_2O$ is more preferably from 0 to 13%.

MgO produces effects of making the glass light, improving the refractive index, and lowering the optical dispersion of the glass. However, if MgO is incorporated in an amount larger than 25%, the glass becomes instable so that the devitrification resistance deteriorates. Thus, the content of MgO is specified into the range from 0 (inclusive) to 25%.

CaO produces effects of making the glass light, improving the refractive index and improving the endurance of the glass. However, if CaO is incorporated in an amount larger than 25%, the glass becomes instable so that the devitrification resistance deteriorates. Thus, the content of CaO is specified into the range from 0 (inclusive) to 25%.

BaO produces effects of adjusting the refractive index and further improving the stability of the glass. However, if the content is more than 25%, the devitrification resistance deteriorates. Thus, the content of BaO is specified into the range from 0 (inclusive) to 25%.

SrO produces effects of making the TL low and improving the stability of the glass. However, if the content is more than 25%, the devitrification resistance deteriorates. Thus, the content of SrO is specified into the range from 0 (inclusive) to 25%.

ZnO produces effects of making the refractive index high, keeping the optical dispersion, and making the TL low. Additionally, ZnO produces effects of making the Tg low and making the linear thermal expansion coefficient small. Thus, this component is an important component for the optical glass of the invention. If the content of ZnO is less than 18%, the refractive index falls so that desired optical constants are not obtained. On the other hand, if the content is more than 55%, the devitrification resistance deteriorates. Thus, the content of ZnO is specified into the range from 18 to 55%. The content of ZnO is more preferably from 18 to 53%.

If the total amount of R'O components wherein R' is Mg, Ca, Ba, Sr and Zn is less than 18%, the refractive index falls so that desired optical constants are not obtained. On the other hand, if the total amount of the R'O components is more than 55%, the devitrification resistance deteriorates. Thus, the total amount of the R'O components is specified into the range from 18 to 55%. The total amount of the R'O components is more preferably from 18 to 53%.

$La_2O_3$ produces effects of making the refractive index of the glass high and further maintaining the optical dispersion. However, if the content thereof is less than 5%, the refractive index falls so that desired optical constants are not obtained. On the other hand, if the content is more than 20%, phase splitting becomes intense so that the TL becomes high. Thus, the content of $La_2O_3$ is specified into the range from 5 to 20%. The content of $La_2O_3$ is more preferably from 5 to 19%.

If necessary, the optical glass of the invention may contain a specified amount of one or more selected from glass components of $Y_2O_3$, $Gd_2O_3$, $TiO_2$, $ZrO_2$, $Nb_2O_5$, $Ta_2O_5$, $WO_3$, $Bi_2O_3$, and $Sb_2O_3$. The reasons why the optionally-added components are limited to these components will be described hereinafter.

$Y_2O_3$ produces an effect of making the refractive index of the glass high. However, if the content thereof is more than 10%, the devitrification resistance of the glass deteriorates so that the TL becomes high. Thus, the content of $Y_2O_3$ is specified into the range from 0 to 10%.

$Gd_2O_3$ produces effects of making the refractive index of the glass high, improving the weather resistance, and lowering the TL. However, if the content thereof is more than 10%, the devitrification resistance of the glass deteriorates. Thus, the content of $Gd_2O_3$ is specified into the range from 0 to 10%.

$TiO_2$ produces an effect of making the refractive index high. However, if the content is more than 5%, the devitrification resistance of the glass deteriorates so that the TL becomes high. Thus, the content of $TiO_2$ is specified into the range from 0 to 5%.

$ZrO_2$ produces effects of making the refractive index and the weather resistance of the glass high. However, if the content is more than 5%, the devitrification resistance of the glass deteriorates so that the TL becomes high. Thus, the range of $ZrO_2$ is specified into the range form 0 to 5%.

$Nb_2O_5$ produces effects of making the refractive index of the glass high and improving the meltability of the glass. However, if the content is more than 10%, given optical dispersion cannot be obtained. Thus, the content of $Nb_2O_5$ is specified into the range from 0 to 10%.

$Ta_2O_5$ produces effects of making the refractive index of the glass high and improving the weather resistance of the glass. However, if the content is more than 10%, the devitrification resistance of the glass deteriorates so that the TL becomes high. Thus, the content of $Ta_2O_5$ is specified into the range from 0 to 10%.

$WO_3$ produces effects of making the refractive index of the glass high and lowering the TL. However, if the content is more than 10%, the coloration degree of the glass deteriorates. Thus, the content of $WO_3$ is specified into the range from 0 to 10%.

$Bi_2O_3$ produces an effect of making the refractive index of the glass high. However, if the content is more than 5%, the coloration degree of the glass deteriorates. Thus, the content of $Bi_2O_3$ is specified into the range from 0 to 5%.

$Sb_2O_3$ produces an effect of improving clarifying effect when a small amount thereof is added to the glass. Thus, the content of $Sb_2O_3$ is specified into the range from 0 to 2%.

Of course, if necessary, glass components and additives known in the prior art, such as CuO and $GeO_2$, may be added to the optical glass of the invention as long as the advantageous effects of the invention are not damaged.

The optical element of the invention is produced by press molding the above-mentioned optical glass. Examples of this press molding process include a direct press molding process of dropping melted glass from a nozzle onto a mold heated to a given temperature and then press molding the glass, and a reheating molding process of putting a pre-form material into a mold, heating the glass to not lower than the softening temperature of the glass, and press molding the glass. Such a pressing process makes it possible to make any polishing or grinding step unnecessary so as to improve the productivity and further yield an optical element having a finished shape or surface which cannot be easily obtained, such as a freely adjusted curved surface or an aspheric surface.

Thus, from the viewpoint of melting productivity and moldability, it is preferred to set the refractive index (nd), the Abbe number (vd), the glass transition temperature (Tg), and the linear thermal expansion coefficient (α) at temperatures from 100 to 300° C. in the range from 1.60 to 1.68, in the range from 48 to 56, to 520° C. or lower, and $100 \times 10^{-7}$/K or less, respectively.

From the viewpoint of devitrification resistance and moldability, it is also preferred to set the liquid phase temperature (TL) and the viscosity at the liquid phase temperature to 1,000° C. or lower and 0.5 poise or more, respectively.

Conditions for the molding are varied in accordance with the glass components, the shape of a product to be formed, and so on. In general, however, the mold temperature is preferably from 350 to 600° C., in particular preferably in a temperature range near to the glass transition temperature. The pressing temperature is preferably from several seconds to several tens of seconds. The press pressure, which is varied in accordance with the shape or size of a lens to be formed, is preferably from $2 \times 10^7$ to $6 \times 10^7$ N/m². As the pressing is performed at a higher pressure, the molding can be attained with a higher precision.

The optical element of the invention can be used as, for example, a photographing lens of a digital camera, a collimator lens of a laser beam printer, a prism, a mirror, or the like.

EXAMPLES

The invention will be more specifically described by way of the following examples. However, the invention is not limited by these examples.

Examples 1 to 10, and Comparative Examples 1 to 3

Ordinary starting materials for glass, such as oxides, carbonates, and nitrates, were used to formulate the starting materials for glass to give each target composition shown in Table 1, and the materials were sufficiently mixed in a powdery form to prepare each compounded material. The compound material was put into a melting furnace heated to a temperature from 1,000 to 1,300° C., melted, clarified, and then stirred so as to be made homogeneous. The resultant was cast into a mold made of iron or carbon and heated in advance, and then cooled slowly to produce each sample. About each of the samples, the following were measured: the refractive index (nd) to the d line, the Abbe number (vd), the glass transition temperature (Tg), the linear thermal expansion coefficient (α), the liquid phase temperature (TL), and the viscosity at the liquid phase temperature. The measurement results are together shown in Table 1.

Comparative Examples 1, 2 and 3 were examples carried out so as to follow Example 4 of EP 552932A, Example 2 of the Japanese Published Unexamined Patent Application No. 6-107425, and Example 11 of the Japanese Published Unexamined Patent Application No. 2003-176151, respectively.

The above-mentioned physical property measurements were performed in accordance with testing methods in Japanese Optical Glass Industrial Standards (JOGIS).

The physical properties were specifically measured as follows:

A) Refractive index (nd) and Abbe number (vd)

As described above, the glasses melted and cast into the mold were each slowly cooled to room temperature at −30° C./hour to prepare a sample. This sample was measured, using a "KPR-200" manufactured by Kalnew Co., Ltd.

B) Glass Transition Temperature (Tg), and Liner Thermal Expansion Coefficient (α)

These were measured using a thermomechanical analysis device "TMA/SS6000" manufactured by Seiko Instruments Inc. under a temperature raising condition of 10° C. per minute.

C) Liquid Phase Temperature (TL)

A melting furnace was used to lower the temperature of each of the glasses made into a melted liquid at 1,200° C. to a given temperature at −100° C./hour, and then the glass was held at the given temperature for 12 hours. Thereafter, the glass was cast into a mold, and then cooled to room temperature, so as to set the temperature of the glass to a temperature at which devitrification (crystal) was not found inside the glass. The inside of the glass was observed with an optical microscope "BX 50" manufactured by Olympus Corporation with a magnification power of 100.

D) Viscosity

The viscosity was measured, using a high-temperature viscometer "TVB-20H model viscometer" manufactured by Advantest Corporation.

TABLE 1

| | | Examples | | | | | | | | | | Comparative Examples | | |
|---|---|---|---|---|---|---|---|---|---|---|---|---|---|---|
| | | 1 | 2 | 3 | 4 | 5 | 6 | 7 | 8 | 9 | 10 | 1 | 2 | 3 |
| Composition (% by weight) | SiO$_2$ | 17.0 | 20.0 | 11.0 | 10.0 | 13.0 | 12.0 | 20.0 | 23.0 | 12.0 | 28.0 | 3.0 | 55.0 | 41.0 |
| | B$_2$O$_2$ | 17.0 | 18.0 | 21.0 | 20.0 | 28.0 | 22.0 | 17.0 | 21.0 | 33.0 | 15.0 | 24.0 | 10.0 | 19.0 |
| | Li$_2$O | 3.0 | | 4.0 | 8.0 | 4.0 | 4.0 | 5.0 | 6.0 | 8.0 | 9.0 | 0.5 | 8.0 | 3.7 |
| | Na$_2$O | | | | | | | | | 4.0 | | | | 2.0 |
| | K$_2$O | | | | | | | | 2.0 | | 3.0 | | | 1.0 |
| | MgO | | | | | | 22.0 | | | | | | | |
| | CaO | 23.0 | | | | | | | | | | | | 2.0 |
| | BaO | | | | 24.0 | | | | | | | | 7.0 | 5.0 |
| | SrO | | | 22.0 | | | | | | | | | | |
| | ZnO | 20.0 | 50.0 | 19.0 | 20.0 | 38.0 | 22.0 | 53.0 | 38.0 | 35.0 | 25.0 | | | 4.0 |
| | La$_2$O$_3$ | 8.0 | 12.0 | 9.0 | 6.0 | 10.0 | 11.0 | 5.0 | 8.0 | 7.0 | 18.5 | | | 16.2 |
| | Y$_2$O$_3$ | | | | 8.0 | | | | | | | 8.0 | | |
| | Gd$_2$O$_3$ | | | 7.0 | | | | | | | | 8.0 | | 1.0 |
| | TiO$_2$ | | | | | | 4.0 | | | | | | 15.0 | |
| | ZrO$_2$ | 3.0 | | | | | | | | 1.0 | | | | |
| | Nb$_2$O$_5$ | 8.0 | | | | | | | | | | | 2.0 | |
| | Ta2O5 | | | 7.0 | | | | | | | | | | 1.0 |
| | WO$_3$ | | | | 4.0 | 7.0 | | | 2.0 | | | | | |
| | Bi$_2$O$_3$ | | | | | | | 3.0 | | | | | | 1.0 |
| | Sb$_2$O$_3$ | 1.0 | | | | | | | | | 1.5 | | | 0.1 |
| | Al$_2$O$_3$ | | | | | | | | | | | | 3.0 | 3.0 |
| | As$_2$O$_3$ | | | | | | | | | | | | | |
| | LaF$_3$ | | | | | | | | | | | 20.0 | | |

TABLE 1-continued

| | Examples | | | | | | | | | | Comparative Examples | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| $BaF_2$ | | | | | | | | | | | 36.0 | | |
| LiF | | | | | | | | | | | 0.5 | | |
| $R_2O(Li_2O + Na_2O + K_2O)$ | 3.0 | 0.0 | 4.0 | 8.0 | 4.0 | 4.0 | 5.0 | 8.0 | 12.0 | 12.0 | 0.5 | 8.0 | 6.7 |
| R'O(MgO + CaO + BaO + SrO + ZnO) | 43.0 | 50.0 | 41.0 | 44.0 | 38.0 | 44.0 | 53.0 | 38.0 | 35.0 | 25.0 | 0.0 | 7.0 | 11.0 |
| Refractive index (nd) | 1.677 | 1.670 | 1.665 | 1.660 | 1.663 | 1.649 | 1.650 | 1.638 | 1.623 | 1.608 | 1.670 | 1.634 | 1.515 |
| Abbe number (vd) | 48.3 | 49.1 | 51.1 | 49.3 | 49.6 | 52.0 | 51.3 | 52.8 | 53.2 | 55.2 | 58.3 | 41.9 | 55.6 |
| Glass transition temperature $T_g$ (° C.) | 505 | 515 | 491 | 476 | 480 | 504 | 475 | 469 | 464 | 460 | 492 | 525 | 596 |
| Linear thermal expansion coefficient α ($\times 10^{-7}$/K) | 80 | 72 | 91 | 96 | 76 | 84 | 70 | 82 | 95 | 97 | 105 | 102 | 95 |
| Liquid phase temperature | 920 | 950 | 900 | 890 | 870 | 900 | 920 | 880 | 850 | 840 | 900 | 1030 | 1080 |
| Viscosity (Poise) at $T_L$ | 3.0 | 6.5 | 1.0 | 8.5 | 12.0 | 11.0 | 10.5 | 13.5 | 9.5 | 20.5 | 0.3 | 85.5 | 145.0 |

As is evident from Table 1, in the optical glasses of Examples 1 to 10, the refractive indexes were from 1.608 to 1.677 and the Abbe numbers were from 48.3 to 55.2. Thus, the glasses had optical constants of high refractive indexes and low dispersion. Additionally, the Tg's were 515° C. or lower so that the glasses were suitable for press molding. The linear thermal expansion coefficients thereof were as small as $97 \times 10^{-7}$/K, the TL's were 950° C. or lower, and the viscosities at the corresponding TL's were 1.0 poise or more. Thus, the glasses were very good in devitrification resistance and moldability.

On the other hand, the optical glass of Comparative Example 1, wherein the ratio of $SiO_2$ was as small as 3.0% and neither ZnO nor $La_2O_3$ was contained, the Abbe number was as large as 58.3, and the linear thermal expansion coefficient was as large as $105 \times 10^{-7}$/K. The viscosity at the liquid phase temperature was as low as 0.3 poise so that the glass was poor in moldability. In the optical glass of Comparative Example 2, wherein the ratio of $SiO_2$ was as large as 55.0%, the ratio of $B_2O_3$ was as small as 10.0%, and neither ZnO nor $La_2O_3$ was contained, the Abbe number was as small as 41.9, the Tg was as high as 525° C. so that the glass was unsuitable for press molding. The linear thermal expansion coefficient was as large as $102 \times 10^{-7}$/K. Furthermore, the liquid phase temperature TL was as high as 1030° C. so that the glass was poor in devitrification resistance. In the optical glass of Comparative Example 3, wherein the ratio of $SiO_2$ was as large as 41.0% and the ratio of ZnO was as small as 4.0%, the Tg was as high as 596° C. or higher so that the glass was unsuitable for press molding. Besides, the liquid phase temperature TL was as high as 1080° C. so that the glass was poor in devitrification resistance.

The optical glasses of the invention, as in the above-mentioned Examples, contain the specified amounts of the given glass components, whereby optical constants of high refractive indexes and low optical dispersion can be obtained without using compounds such as lead and arsenic, which give fears of bad effects onto the human bodies. Moreover, the optical glasses have low Tg's to give a very good press formability, and further have low TL's to give a very good devitrification resistance.

The optical elements of the invention, as in the above-mentioned Examples, are produced by press molding the above-mentioned optical glasses; therefore, the optical elements have characteristics of the optical glasses, and have high production efficiency so that the costs of the optical elements can be decreased.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. An optical glass for press molding, consisting essentially of:
   $SiO_2$: 10 to 30% by weight,
   $B_2O_3$: 15 to 35% by weight,
   $Li_2O$: 0 (inclusive) to 10% by weight,
   $Na_2O$: 0 (inclusive) to 5% by weight,
   $K_2O$: 0 (inclusive) to 5% by weight,
   $Li_2O+Na_2O+K_2O$: 0 (inclusive) to 15% by weight,
   MgO: 0 (inclusive) to 25% by weight,
   CaO: 0 (inclusive) to 25% by weight,
   SrO: 0 (inclusive) to 25% by weight,
   ZnO: 35 to 55% by weight,
   MgO+CaO+SrO+ZnO: 35 to 55% by weight,
   $La_2O_3$: 5 to 20% by weight,
   $Gd_2O_3$: 0 to 10% by weight,
   $ZrO_2$: 0 to 5% by weight,
   $Nb_2O_5$: 0 to 10% by weight,
   $WO_3$: 0 to 10% by weight,
   $Bi_2O_3$: 0 to 5% by weight, and
   $Sb_2O_3$: 0 to 1% by weight,
   wherein the optical glass does not include $Y_2O_3$, $TiO_2$, BaO, and $Ta_2O_3$.

2. An optical glass according to claim 1, wherein the refractive index of the optical glass is in the range from 1.60 to 1.68.

3. An optical glass according to claim 1, wherein the Abbe number of the optical glass is in the range from 48 to 56.

4. An optical glass according to claim 1, wherein the glass transition temperature of the optical glass is 520° C. or lower.

5. An optical glass according to claim 1, wherein the linear thermal expansion coefficient of the optical glass at temperatures from 100 to 300° C. is $100 \times 10^{-7}$/K or less.

6. An optical glass according to claim 1, wherein the liquid phase temperature of the optical glass is 1,000° C. or lower.

7. An optical glass according to claim 6, wherein the viscosity of the liquid phase temperature is 0.5 poise or more.

8. An optical element being made from an optical glass according to claim 1.

9. An optical glass for press molding, consisting of:
$SiO_2$: 10 to 30% by weight,
$B_2O_3$: 15 to 35% by weight,
$Li_2O$: 0 (inclusive) to 10% by weight,
$Na_2O$: 0 (inclusive) to 5% by weight,
$K_2O$: 0 (inclusive) to 5% by weight,
$Li_2O+Na_2O+K_2O$: 0 (inclusive) to 15% by weight,
MgO: 0 (inclusive) to 25% by weight,
CaO: 0 (inclusive) to 25% by weight,
SrO: 0 (inclusive) to 25% by weight,
ZnO: 35 to 55% by weight,
MgO+CaO+SrO+ZnO: 35 to 55% by weight,
$La_2O_3$: 5 to 20% by weight,
$Gd_2O_3$: 0 to 10% by weight,
$ZrO_2$: 0 to 5% by weight,
$Nb_2O_5$: 0 to 10% by weight,
$WO_3$: 0 to 10% by weight,
$Bi_2O_3$: 0 to 5% by weight, and
$Sb_2O_3$: 0 to 1% by weight.

* * * * *